US007139382B1

(12) United States Patent
Smith

(10) Patent No.: US 7,139,382 B1
(45) Date of Patent: Nov. 21, 2006

(54) SYSTEM AND METHOD FOR RESTRICTING INCOMING CALLS

(75) Inventor: Benjamin V. Smith, Maylene, AL (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 226 days.

(21) Appl. No.: 10/237,486

(22) Filed: Sep. 9, 2002

(51) Int. Cl.
H04M 3/42 (2006.01)
H04M 1/56 (2006.01)
H04M 15/06 (2006.01)
H04M 7/00 (2006.01)

(52) U.S. Cl. .......................... 379/210.02; 379/142.03; 379/221.08

(58) Field of Classification Search ............ 379/142.01, 379/142.03, 142.06, 221.08–221.11, 142.02, 379/210.02, 88.22
See application file for complete search history.

(56) References Cited

U.S. PATENT DOCUMENTS

| 4,278,844 | A | | 7/1981 | Jones |
| 5,060,255 | A | | 10/1991 | Brown |
| 5,177,685 | A | | 1/1993 | Davis et al. |
| 5,333,180 | A | | 7/1994 | Brown et al. |
| 5,438,568 | A | | 8/1995 | Weisser, Jr. |
| 5,583,976 | A | * | 12/1996 | Bullard, Jr. ................. 345/440 |
| 5,586,169 | A | | 12/1996 | Pinard |
| 5,596,627 | A | * | 1/1997 | Solomon et al. .......... 379/88.26 |
| 5,742,905 | A | | 4/1998 | Pepe et al. |
| 5,854,835 | A | * | 12/1998 | Montgomery et al. . 379/112.06 |
| 5,854,836 | A | | 12/1998 | Nimmagadda |
| 5,867,498 | A | | 2/1999 | Gillman et al. |
| 5,999,611 | A | | 12/1999 | Tatchell et al. |
| 6,009,409 | A | | 12/1999 | Adler et al. |
| 6,052,598 | A | | 4/2000 | Rudrapatna |
| 6,160,877 | A | * | 12/2000 | Tatchell et al. ............. 379/197 |
| 6,161,128 | A | | 12/2000 | Smyk |
| 6,181,996 | B1 | | 1/2001 | Chou et al. |
| 6,188,757 | B1 | * | 2/2001 | Malik ..................... 379/207.02 |
| 6,282,281 | B1 | | 8/2001 | Low |
| 6,298,122 | B1 | * | 10/2001 | Horne ...................... 379/93.09 |
| 6,310,939 | B1 | * | 10/2001 | Varney ..................... 379/88.01 |
| 6,317,058 | B1 | | 11/2001 | Lemelson et al. |
| 6,377,993 | B1 | | 4/2002 | Brandt |
| 6,381,316 | B1 | | 4/2002 | Joyce et al. |
| 6,480,783 | B1 | | 11/2002 | Myr |
| 6,556,997 | B1 | | 4/2003 | Levy |
| 6,647,106 | B1 | * | 11/2003 | Hussain et al. ........ 379/207.02 |
| 6,650,902 | B1 | | 11/2003 | Richten |
| 6,677,894 | B1 | | 1/2004 | Sheynblat |
| 6,741,188 | B1 | | 5/2004 | Miller |
| 6,785,551 | B1 | | 8/2004 | Richard |
| 6,876,735 | B1 | * | 4/2005 | Hill et al. ............... 379/207.02 |
| 6,888,929 | B1 | | 5/2005 | Saylor et al. |
| 2001/0029425 | A1 | | 10/2001 | Myr |

(Continued)

OTHER PUBLICATIONS

"Bell Labs Technology: A soft' handoff for improved service," printed from http://www.bell-labs.com/technology/wireless/soft.html Internet site, accessed on Jun. 19, 2002, 1 page.

(Continued)

Primary Examiner—Benny Q. Tieu
(74) Attorney, Agent, or Firm—Withers & Keys, LLC

(57) ABSTRACT

A method for restricting the completion of a call made to a subscriber is disclosed. The method includes activating a termination attempt trigger, requesting call-processing instructions in response to detection of the activated termination attempt trigger, receiving call-processing instructions, and redirecting the call responsive to the call-processing instructions.

21 Claims, 8 Drawing Sheets

U.S. PATENT DOCUMENTS

| | | | |
|---|---|---|---|
| 2001/0036258 A1* | 11/2001 | Sugla ..................... | 379/211.01 |
| 2001/0046280 A1* | 11/2001 | Crockett et al. ......... | 379/88.22 |
| 2002/0027512 A1 | 3/2002 | Horita et al. | |
| 2002/0036584 A1 | 3/2002 | Jocoy et al. | |
| 2002/0085698 A1* | 7/2002 | Liebenow .............. | 379/207.13 |
| 2002/0101360 A1 | 8/2002 | Schrage | |
| 2002/0126708 A1 | 9/2002 | Skog | |
| 2003/0043983 A1* | 3/2003 | Pelletier et al. ........ | 379/142.01 |
| 2004/0174978 A1* | 9/2004 | Bedingfield et al. ... | 379/221.02 |
| 2004/0246147 A1 | 12/2004 | von Grabe | |

OTHER PUBLICATIONS

"Bell Labs Technology: Customers want more data services," printed from http://www.bell-labs.com/technology/wireless/customerswantdata.html Internet site, accessed on Jun. 19, 2002, 1 page.

"Bell Labs Technology: Early mobile telephone service," printed from http://www.bell-labs.com/technology/wireless/earlyservice.html Internet site, accessed on Jun. 19, 2002, 2 pages.

"Bell Labs Technology: Focusing on wireless transmission—everywhere," printed from http://www.bell-labs.com/technology/wireless/everywhere.html Internet site, accessed on Jun. 19, 2002, 1 page.

"Bell Labs Technology: How do I receive a mobile call?" printed from http://www.bell-labs.com/technology/wireless/receive.html Internet site, accessed on Jun. 19, 2002, 1 page.

"Bell Labs Technology: How does a mobile call its destination?" printed from http://www.bell-labs.com/technology/wireless/destination.html Internet site, accessed on Jun. 19, 2002, 2 pages.

"Bell Labs Technology: How is a mobile system designed?" printed from http://www.bell-labs.com/technology/wireless/design.html Internet site, accessed on Jun. 19, 2002, 1 page.

"Bell Labs Technology: How is Lucent fueling the Untethered Revolution?" printed from http://www.bell-labs.com/technology/wireless/fueling.html Internet site, accessed on Jun. 19. 2002, 1 page.

"Bell Labs Technology: Let's make a mobile phone call," printed from http://www.bell-labs.com/technology/wireless/call.html Internet site, accessed on Jun. 19, 2002, 1 page.

"Bell Labs Technology: Lucent's support of international standards," printed from http://www.bell-labs.com/technology/wireless/lucent.html Internet site, accessed on Jun. 19, 2002, 1 page.

"Bell Labs Technology: Mobile wireless means wireless access," printed from http://www.bell-labs.com/technology/wireless/mobileaccess.html Internet site, accessed on Jun. 19, 2002, 2 pages.

"Bell Labs Technology: Pinpointing your location," printed from http://www.bell-labs.com/technology/wireless/pinpoint.html Internet site, accessed on Jun. 19, 2002, 1 page.

"Bell Labs Technology: Slicing up the cellular pie," printed from http://www.bell-labs.com/technology/wireless/pie.html Internet site, accessed on Jun. 19, 2002, 1 page.

"Bell Labs Technology: Switching a mobile call at 55 miles per hour," printed from http://www.bell-labs.com/technology/wireless/switching.html Internet site, accessed on Jun. 19, 2002, 2 pages.

"Bell Labs Technology: There are some limits on wireless data transmission," printed from http://www.bell-labs.com/technology/wireless/limitsondata.html Internet site, accessed on Jun. 19, 2002, 1 page.

"Bell Labs Technology: Too many technological standards," printed from http://www,bell-labs.com/technology/wireless/standards.html Internet site, accessed on Jun. 19, 2002, 1 page.

"Bell Labs Technology: Understanding Wireless Mobile Communications," printed from http://www.bell-labs.com/technology/wireless/ Internet site, accessed on Jun. 19, 2002, 2 pages.

"Bell Labs Technology: What if I've moved out of my service porvider's area?" printed from http://www.bell-labs.com/technology/wireless/moved.html Internet site, accessed on Jun. 19, 2002, 1 page.

"Bell Labs Technology: What is a 'cell'?" printed from http://www.bell-labs.com/technology/wireless/cell.html Internet site, accessed on Jun. 19, 2002, 2 pages.

"Bell Labs Technology: What's hot today? Wireless date!" printed from http://www.bell-labs.com/technology/wireless/hotdata.html Internet site, accessed on Jun. 19, 2002, 1 page.

"Bell Labs Technology: What's the difference between 'cellular' and 'PCS'?" printed from http://www.bell-labs.com/technology/wireless/difference.html Internet site, accessed on Jun. 19, 2002, 1 page.

"Cingular Wireless Selects TruePosition® as Location Technology Provider for its Nationwide Wireless Network," printed from http://www.trueposition.com/news_cingular.html Internet site, accessed on Nov. 11, 2001, 2 pages.

"HeyAnita—Engaging your world through voice," printed from http://www.heyanita.com/p_login2.asp Internet site, accessed on Jun. 10, 2002, 1 page.

"HeyAnita—Engaging your world through voice," printed from http://www.heyanita.com/Technology/t_products.asp Internet site, accessed on Jun. 10, 2002, 4 pages.

"Home Toys Article," printed from http://www.hometoys.com/htinews/oct99/articles/panja/panja.htm Internet site, accessed on Jun. 10, 2002, 3 pages.

"How 911 works," printed from http://contact.bellsouth.com/email/bbs/phase2/how911works.html Internet site, accessed on Jun. 19, 2002, 6 pages.

"IEC: Wireless Intelligent Network (WIN)," printed from http://www.iec.org/online/tutorials/win/topic01/html?Back.x=17&Back.y=14 Internet site, accessed on Aug. 6, 2002, 3 pages.

"IEC: Wireless Intelligent Network (WIN)," printed from http://www.iec.org/online/tutorials/win/topic02.html?Next.x=38&Next.y=13 Internet site, accessed on Aug. 6, 2002, 3 pages.

"IEC: Wireless Intelligent Network (WIN)," printed from http://www.iec.org/online/tutorials/win/topic03.html?Next.x=35&Next.y=14 Internet site, accessed on Aug. 6, 2002, 3 pages.

"IEC: Wireless Intelligent Network (WIN)," printed from http://www.iec.org/online/tutorials/win/topic04.html?Next.x=37&Next.y=17 Internet site, accessed on Aug. 6, 2002, 2 pages.

"IEC: Wireless Intelligent Network (WIN)," printed from http://www.iec.org/online/tutorials/win/topic05.html?Next.x=36&Next.y=13 Internet site, accessed on Aug. 6, 2002, 2 pages.

"Position Location Solutions," printed from www.cdmatech.com/solution/pdf/positionlocation.pdf Internet site, accessed on Jun. 10, 2002, 4 pages.

"SF Bay Traffic.info," printed from http://www.sfbaytraffic.info/aboutus.htm Internet site, accessed on Jun. 10, 2002, 2 pages.

"SF Bay Traffic.info," printed from http://www.sfbaytraffic.info/cgi-bin/welcome.cgi Internet site, accessed on Jun. 10, 2002, 2 pages.

"SF Bay Traffic.info," printed from http://www.sfbaytraffic.info/howitworks.htm Internet site, accessed on Jun. 13, 2002, 2 pages.

"SMS Services," printed from http://www.cointel.co.za/smsservicesframe.htm Internet site, accessed on Jun. 10, 2002, 6 pages.

"Stratgis: Press Resources," printed from http://www.strategisgroup.com/press/findings.asp?ObjectId=48624&HomePage=True Internet site, accessed on Jun. 10, 2002, 8 pages.

"TrafficMode.Com," printed from http://www.trafficmode.com/page714214.htm Internet site, accessed on Jun. 10, 2002, 3 pages.

Wang, Jin, et al., "Wireless Voice-over-IP and Implications for Third-Generation Network Design," Bell Labs Technical Journal, Jul.-Sep. 1998, pp. 79-97.

U.S. Appl. No. 10/194,691, filed Jul. 12, 2002.
U.S. Appl. No. 10/217,283, filed Aug. 12, 2002.
U.S. Appl. No. 10/236,489, filed Sep. 6, 2002.
U.S. Appl. No. 10/236,524, filed Sep. 6, 2002.
U.S. Appl. No. 10/237,346, filed Sep. 9, 2002.
U.S. Appl. No. 10/447,030, filed May 28, 2003.

* cited by examiner

SYSTEM AND METHOD FOR RESTRICTING INCOMING CALLS

BACKGROUND

The present application is related, generally, to systems and methods for restricting incoming calls. For a variety of reasons, there are times when a telephone customer may not want to be disturbed by the ringing that announces an incoming telephone call. To prevent the receipt of such calls, customers have resorted to unplugging the jack, leaving the telephone off-hook, turning off the ringer, or subscribing to a call forwarding service. Although such remedies can be effective in stopping the telephone from ringing, each remedy has shortcomings associated therewith.

Unplugging the jack from a telephone disconnects the telephone from the telephone system. During the time the telephone is disconnected, no outgoing calls can be placed from the telephone, and no incoming calls can be received at the telephone. Leaving the telephone off-hook allows for the placement of outgoing calls but prevents the receipt of any incoming calls, including calls that the customer may have wanted to receive. In addition, leaving the telephone off-hook typically results in the generation of a beeping sound, a sound some customers consider to be more annoying than the ringing that announces an incoming telephone call. Call forwarding services allow for the placement of outgoing calls and can automatically redirect all incoming calls, even calls the customer may have wanted to receive, to the customer's voice mailbox. Although a calling party can leave a voice message for the customer, the customer does not know who called or why they called until the message is retrieved.

SUMMARY

In one general respect, the present invention is directed to a system for restricting incoming calls. According to one embodiment, the system includes a service switching point connected to a subscriber line having a termination attempt trigger provisioned thereto, a service control point in communication with the service switching point, and an intelligent peripheral in communication with the service switching point. The service control point is for executing a call restriction Service Program Application (SPA), and the intelligent peripheral is for executing a call restriction override SPA.

In another general respect, the present invention is directed to a method for restricting incoming calls. According to one embodiment, the method includes activating a termination attempt trigger, requesting call-processing instructions in response to detection of the activated termination attempt trigger, receiving the call-processing instructions, and redirecting the call responsive to the call-processing instructions.

DESCRIPTION

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these and other elements may be desirable. However, because such elements are well known in the art, and because they do not facilitate a better understanding of the present invention, a discussion of such elements is not provided herein.

According to one embodiment, the present invention utilizes the intelligent functionality of an Advanced Intelligent Network (AIN). The AIN is a network used in conjunction with a conventional telephone network, such as the public switched telephone network (PSTN), to provide enhanced voice and data services and dynamic routing capabilities using two different networks. The actual voice call is transmitted over a circuit-switched network, but the signaling is done on a separate packet-switched network. The functioning of an AIN is disclosed in U.S. Pat. No. 5,438,568, which is incorporated herein by reference.

Figure 1:
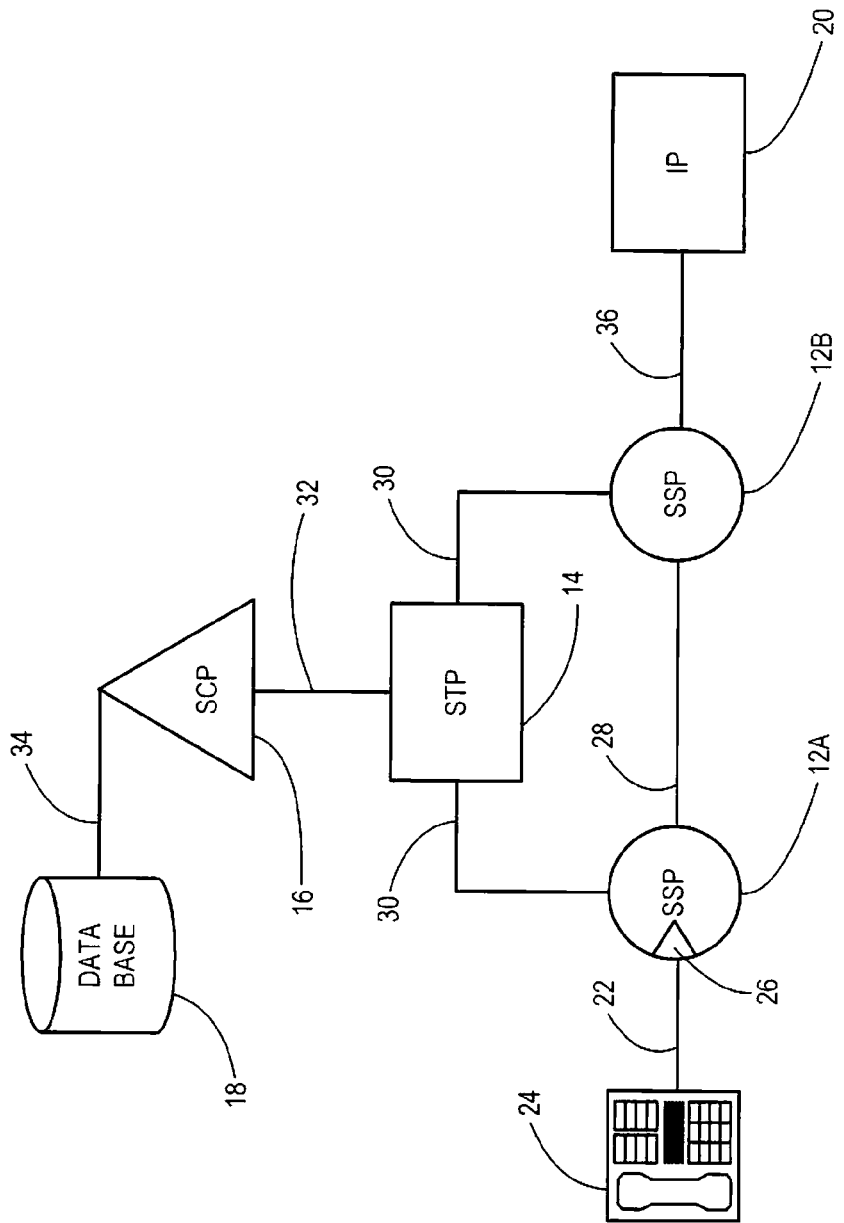
FIG. 1 illustrates one embodiment of a call restriction system.

FIG. 1 illustrates one embodiment of a call restriction system 10. The call restriction system 10 may be utilized in conjunction with a telephone network such as, for example, the Public Switched Telephone Network (PSTN), to restrict the completion of incoming calls to a subscriber of a call restriction service. The call restriction system 10 may include Service Switching Points (SSPs) 12, a Signal Transfer Point (STP) 14, a Signal Control Point (SCP) 16, a database 18, and an Intelligent Peripheral (IP) 20.

The SSP 12a may be a central office switch used to interconnect customer premises equipment (i.e., terminal equipment such as telephones, modems, or answering machines that are connected to the telephone network and reside on the customers' premises). The SSP 12a may have a plurality of subscriber lines 22 connected thereto. The subscriber lines 22 may be, for example, local loops comprising conventional twisted pair loop circuits connected between the SSP 12a and the customer premises equipment. Each subscriber line 22 connected to the SSP 12a may also be connected to a terminating piece of customer premises equipment such as, for example, a landline telephone 24. Alternatively, the terminating equipment may be any other type of communications unit such as, for example, a telecopier, a personal computer, a modem, an answering machine, or a private branch exchange (PBX) switching system.

A subscriber line 22 may be connected to the SSP 12a and have a termination attempt trigger 26 provisioned thereto. The termination attempt trigger 26 may be provisioned to the subscriber line 22 such that any call placed to that subscriber line 22 would activate the termination attempt trigger 26. When the SSP 12a recognizes or detects that the termination attempt trigger 26 has been activated by an incoming call, the SSP 12a may suspend normal call processing, then query the SCP 16 for instructions as to how to process the call.

The SSP 12b may be a host SSP connected to the IP 20 as described in more detail hereinbelow. The SSP 12b may be similar to the SSP 12a, and may be connected to the SSP 12a via communication link 28, which may be, for example, one or more trunk circuits, such as T-1 trunk circuits. According to one embodiment, the call restriction system 10 may include a plurality of SSPs. For example, any number of SSPs similar to the SSP 12a may be connected between the SSP 12a and the SSP 12b, and may be connected to one another via communication link 28.

The STP 14 is a packet switch that routes signaling and control messages between the SSPs 12 and the SCP 16. As illustrated in FIG. 1, the STP 14 is in communication with the SSPs 12 via communication link 30 and with the SCP 16 via communication link 32. Communication links 30, 32 employ out-of-band signaling using, for example, the Signaling System 7 (SS7) signaling protocol.

The SCP 16 is a server associated with a database 18, and may provide instructions to the SSPs 12 as requested and required. The SCP 16 may be an intelligent database server such as, for example, an Intelligent Network Service Control Point available from Lucent Technologies Inc., Murray Hill, N.J. The intelligent functionality of the SCP 16 may be realized by application programs, such as programmable Service Program Applications (SPA), which are executed by the SCP 16. According to one embodiment, the SCP 16 may execute a call restriction SPA associated with the call restriction service of the present invention that may be enabled or disabled by a subscriber to the call restriction service. According to one embodiment, the subscriber may turn the call restriction service on and off via a touch-tone telephone. For example, the subscriber may call a special telephone number to toggle the call restriction service on or off.

The database 18 may be for storing customer information used in providing enhanced calling services, such as the call restriction service provided by the call restriction system 10. According to one embodiment, the database 18 may be in communication with the SCP 16 via communication link 34, which may be, for example, a portion of a communication network such as, for example, a Local Area Network (LAN), a Metropolitan Area Network (MAN), or a Wide Area Network (WAN). According to another embodiment, the database 18 may reside at the SCP 16. Although the call restriction system 10 illustrated in FIG. 1 only shows one database 18 associated with the SCP 16, it is understood that more than one database 18 may be associated with the SCP 16.

The IP 20 may provide an enhanced feature or service that requires an audio connection between the IP 20 and customer premises equipment connected to a subscriber line 22. The IP 20 may be any type of AIN-compliant service node, and may be, for example, a Compact Services Node (CSN) available from Lucent Technologies Inc., Murray Hill, N.J. According to one embodiment, the IP 20 may be associated with one or more databases (not shown). Similar to the SCP 16, the intelligent functionality of the IP 20 may be realized by programmable SPAs executable by the IP 20. According to one embodiment, the IP 20 may execute a call restriction override SPA associated with the call restriction service.

As illustrated in FIG. 1, the IP 20 is in communication with the SSP 12b via communication link 36. Communication link 36 may be, for example, an Integrated Service Digital Network (ISDN) Primary Rate Interface (PRI), an ISDN Basic Rate Interface (BRI), or a T-1 trunk circuit.

Although the call restriction system 10 illustrated in FIG. 1 includes only two SSPs 12, one STP 14, one SCP 16, one database 18, and one IP 20, it is understood that the call restriction system 10 may further include an additional number of these components as well as other network components that are not included in FIG. 1 for purposes of clarity. For example, the call restriction system 10 may additionally include redundant STPs and SCPs to take over if the STP 14 or the SCP 16 should fail. Further, the call restriction system 10 may include regional STPs and regional SCPs in communication with, for example, the local STP 14, for routing and servicing calls between different Local Exchange Carriers (LECs).

Figure 2:
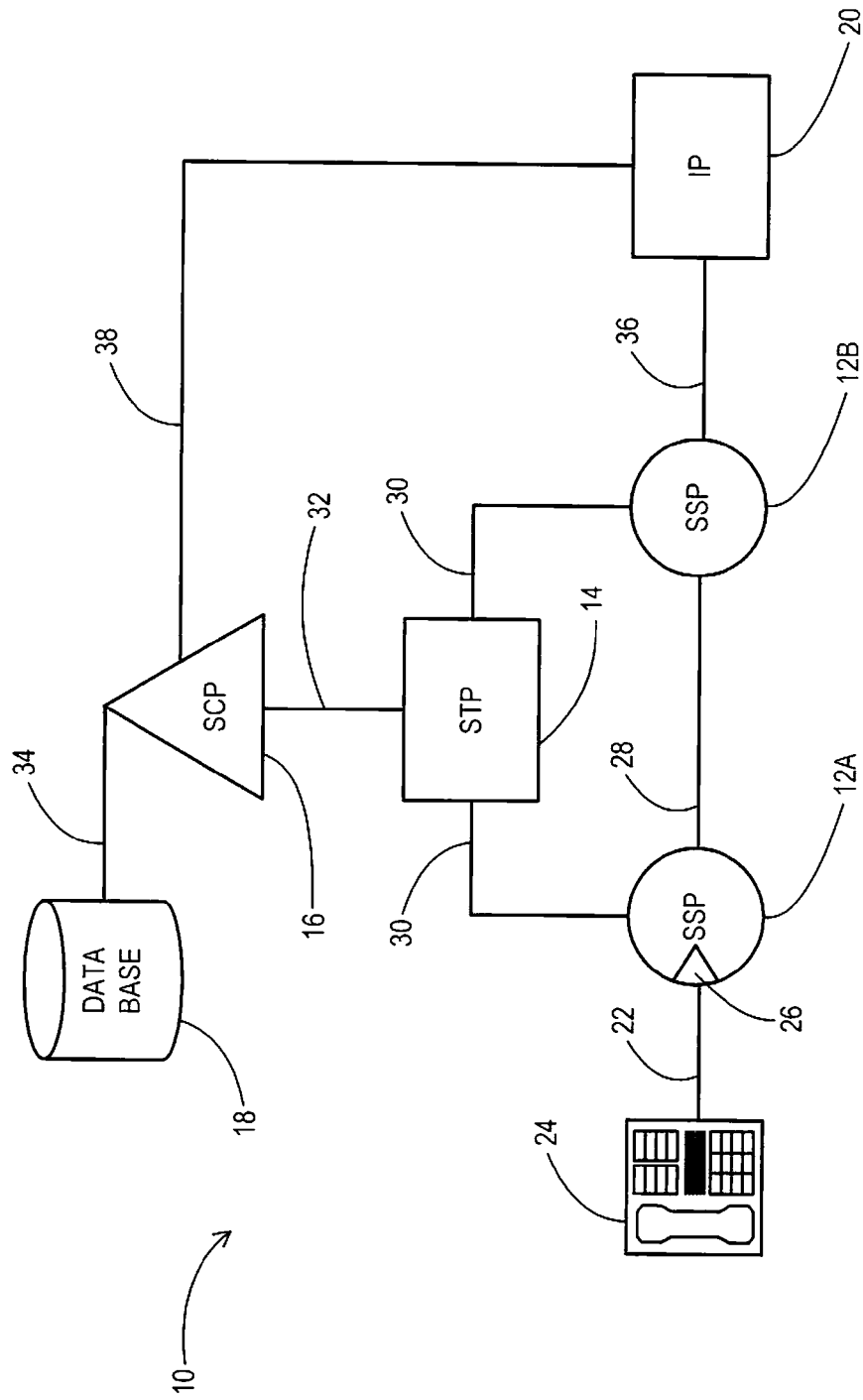
FIG. 2 illustrates another embodiment of the call restriction system.

FIG. 2 illustrates another embodiment of the call restriction system 10. The call restriction system 20 is similar to the call restriction system 10 of FIG. 1, but also includes a communication link 38 connected between the SCP 16 and the IP 20. Therefore, according to this embodiment, the SCP 16 may communicate directly with the IP 20, and may provide instructions to the IP 20 as requested and required. The communication link 38 may be, for example, a portion of a communication network such as, for example, a Local Area Network (LAN), a Metropolitan Area Network (MAN), or a Wide Area Network (WAN).

Figure 3A:
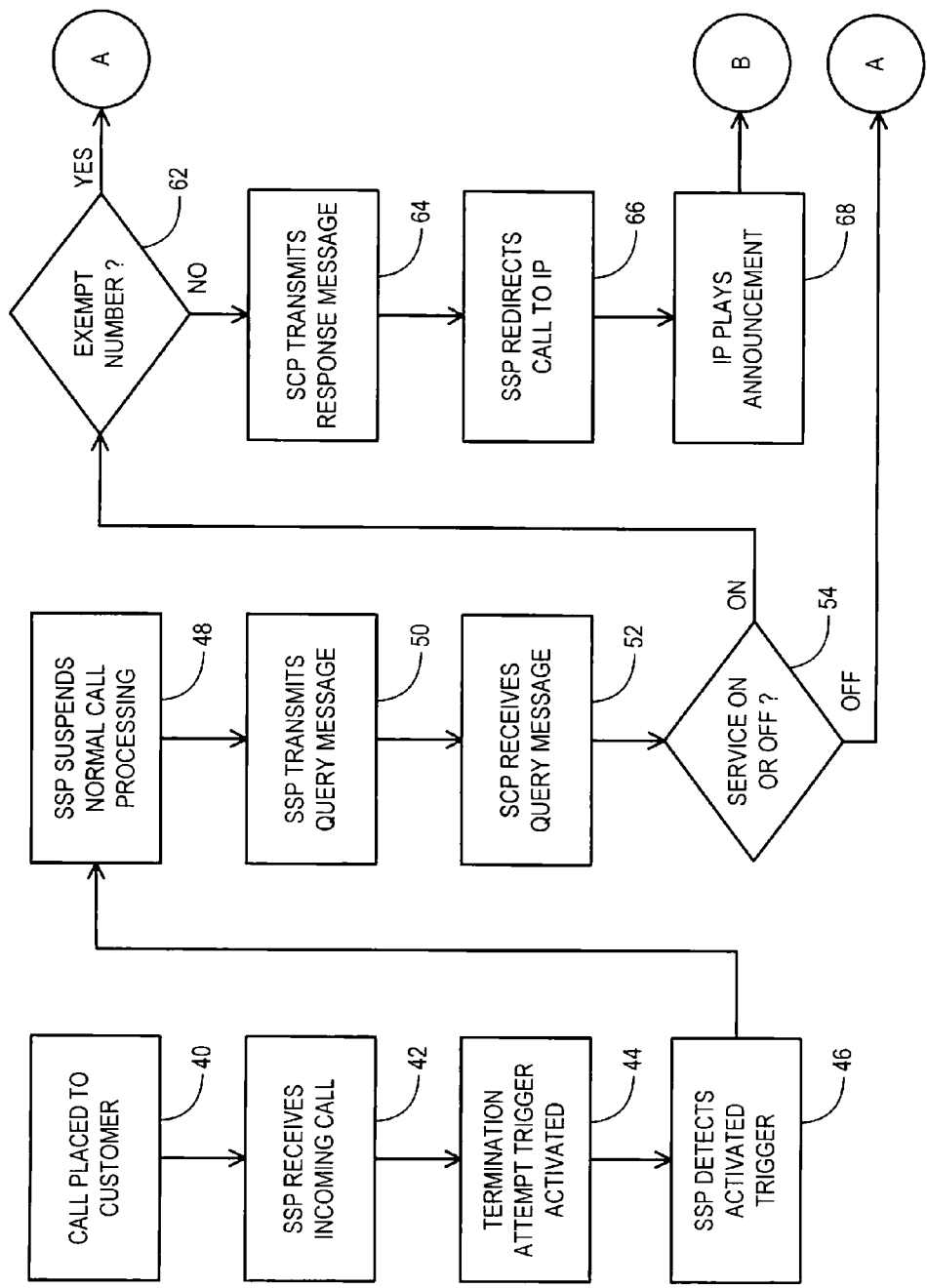
FIGS. 3A–3C illustrate one embodiment of a process flow of the call restriction system of FIG. 1.
Figure 3B:
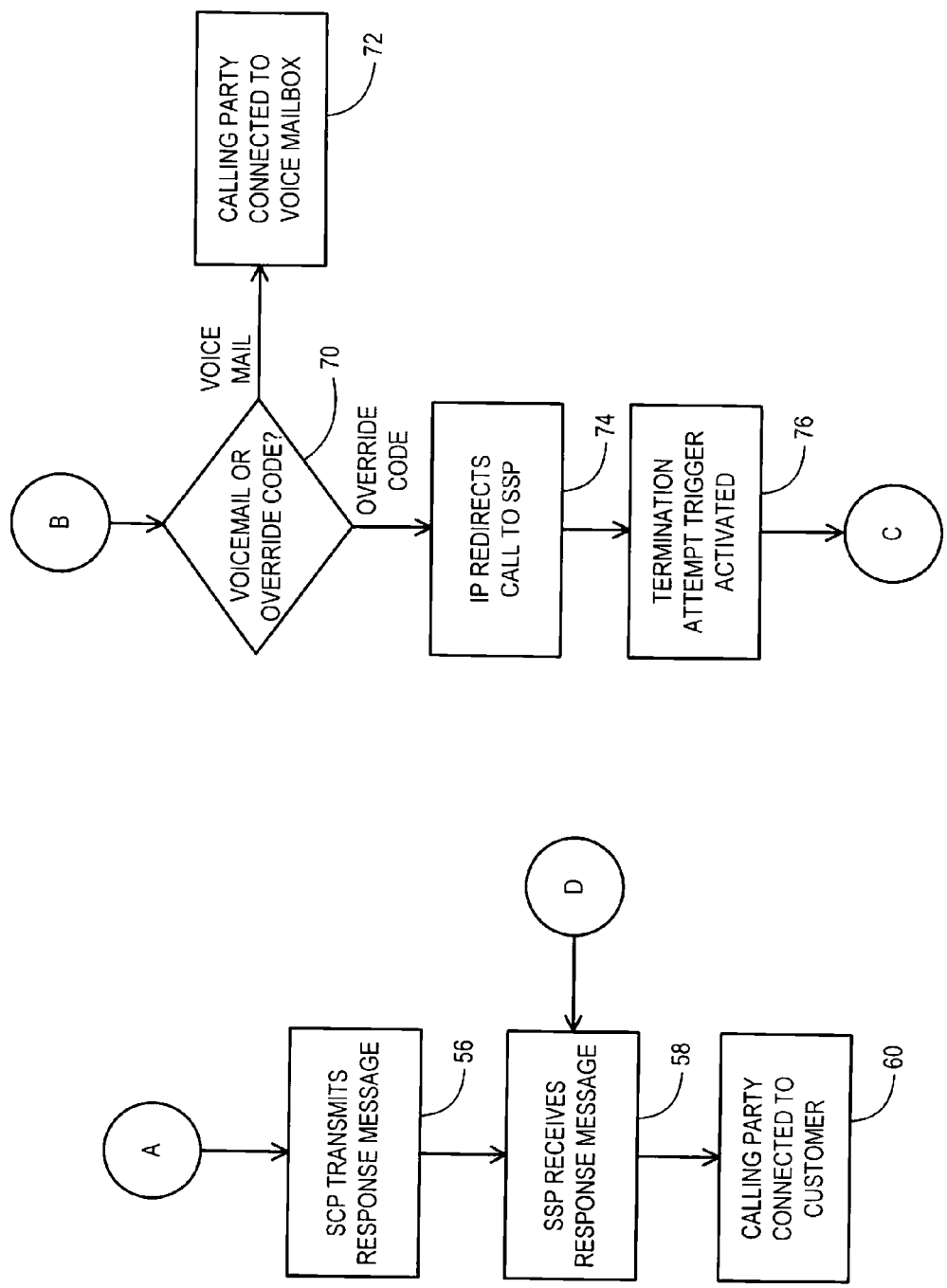
Figure 3C:
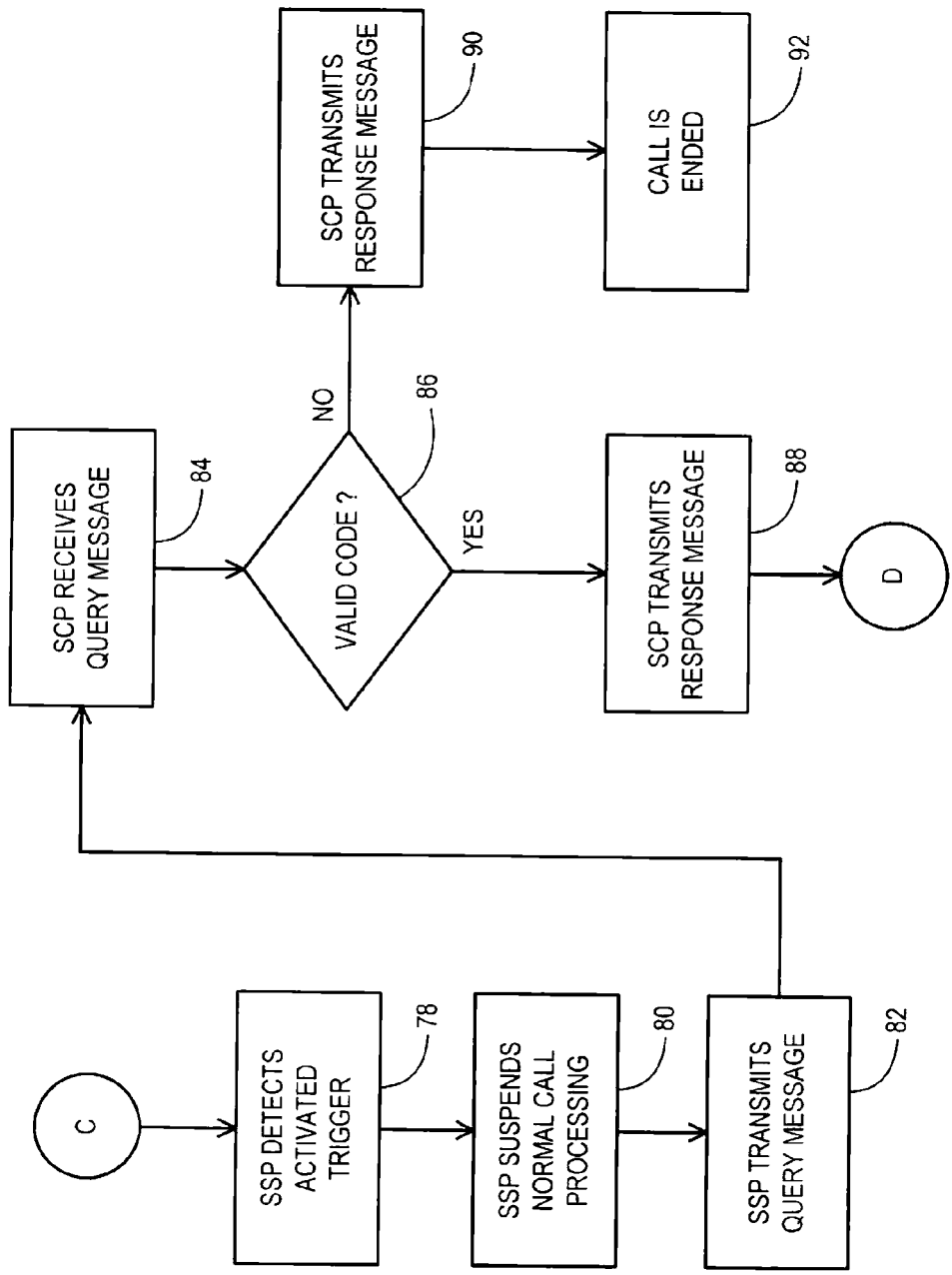

FIGS. 3A–3C illustrate one embodiment of the process flow of the call restriction system 10 of FIG. 1. According to this embodiment, when a customer first subscribes to a call restriction service, certain information must be provisioned before the call restriction service can become fully operational for the subscriber. Such information may be provisioned at the SCP 16 and may include, for example, the name of the customer, the customer's landline telephone number, a telephone number that the customer wishes to have incoming calls redirected to while the call restriction service is enabled, and exempt telephone numbers that the customer wishes to have calls originating therefrom automatically bypass the call restriction service. The customer may designate any number of such exempt telephone numbers. Provisioned information may also include, for example, one or more service override codes for bypassing the call restriction service. A system administrator may provision the call restriction service by entering the information via a Service Management System (SMS) that is in communication with the call restriction system 10. The information may be modified at any time and as often as the customer desires. Alternatively, the customer may provision the call restriction service remotely via the Internet by providing information to a web server (not shown), which in turn passes the information to the SMS for provisioning of the call restriction service. For the call restriction system 10 of FIG. 2, the information may be provisioned to the IP 20 via the SCP 16 and communication link 38. Once the necessary information has been provisioned, the subscriber may activate the call restriction service.

The process begins at block 40, where a calling party places a call to the customer's landline telephone 24. The call may be placed, for example, from a landline telephone or a mobile telephone. From block 40, the process proceeds to block 42, where the call is received at the SSP 12a connected to the subscriber line 22, which is connected to the customer's landline telephone 24. From block 42, the process proceeds to block 44, where the incoming call activates the termination attempt trigger 26 provisioned to the subscriber line 22 connected to the customer's landline telephone 24. From block 44, the process proceeds to block 46, where the SSP 12a detects or recognizes that the termination attempt trigger 26 has been activated. From block 46, the process proceeds to block 48, where the SSP 12a suspends normal call processing, and generates a query message for call-processing instructions. Such generation may include, for example, assembling an information-collected message that comprises a portion of the query message.

From block 48, the process proceeds to block 50, where the SSP 12a transmits the query message to the SCP 16 via the STP 14. The query message may be transmitted via-out-of-band signaling using the SS7 signaling protocol. From block 50, the process proceeds to block 52, where the SCP 16 receives the query message transmitted from the SSP 12*a*.

From block 52, the process proceeds to block 54, where the SCP 16 determines whether the call restriction service is turned on or off. The SCP 16 may determine whether the call restriction service is turned on or off by checking a flag indicative of whether the call restriction SPA associated with the call restriction service is enabled or disabled. From block 54, the process may proceed to block 56, or to block 62.

If the call restriction service is turned off, the process proceeds from block 54 to block 56, where the SCP 16 generates a message in response to the query message and transmits the response message to the SSP 12*a* via the STP 14. The response message may be an analyze route message and may include, for example, an instruction to process the call in the normal manner. From block 56, the process proceeds to block 58, where the SSP 12*a* receives the response message transmitted from the SCP 16. From block 58, the process proceeds to block 60, where the SSP 12*a* connects the calling party to the customer's landline telephone 24 via the subscriber line 22.

If the call restriction service is turned on, the process proceeds from block 54 to block 62, where the SCP 16 determines whether the calling party's telephone number is an exempt telephone number. The SCP 16 may determine whether the calling party's telephone number is an exempt telephone number by comparing the calling party's telephone number to a list of exempt telephone numbers populated in the database 18. From block 62, the process may proceed to block 56, or to block 64.

If the calling party's telephone number is an exempt telephone number, the process proceeds from block 62 to block 56, where the process proceeds as described hereinabove. If the calling party's telephone number is not an exempt telephone number, the process proceeds from block 62 to block 64, where the SCP 16 generates a message in response to the query message and transmits the response message to the SSP 12*a* via the STP 14. The response message may be an analyze route message and may include, for example, an instruction to redirect the call to the IP 20. From block 64, the process proceeds to block 66, where the SSP 12*a* receives the response message and redirects the call to the IP 20. The SSP 12*a* may redirect the call to the IP 20 by redirecting the call to the host SSP 12*b* via communication link 28, which in turn passes the call to the IP 20 via communication link 36. According to one embodiment, the call may pass thru any number of SSPs between the SSP 12*a* and the host SSP 12*b*. According to another embodiment, the subscriber line 22 connected to the customer's landline telephone 24 may be connected to the host SSP 12*b* that is in communication with the IP 20 via communication link 36. For this embodiment, the SSP 12*b* is the SSP that sends the query message to the SCP 16, receives the response message from the SCP 16, and redirects the call directly to the IP 20 via communication link 36.

From block 66, the process proceeds to block 68, where the IP 20 takes control of the call and plays an announcement to the calling party. The announcement may inform the calling party that the customer does not wish to receive any incoming telephone calls at that time. The announcement may also give the calling party the option of entering a service override code to connect the calling party to the customer's landline telephone 24, or the option of leaving a voice message for the customer. For example, according to one embodiment, the announcement may instruct the calling party to enter a service override code to connect to the customer, or to press the numeral "1" to leave a voice message for the customer. The calling party may enter the service override code by pressing a combination of the buttons of a touch-tone telephone. According to another embodiment, the announcement may prompt the calling party to verbalize the service override code to connect to the customer, or to speak the word "one" to leave a voice message for the customer. From block 68, the process proceeds to block 70, where the IP 20 determines whether the calling party has responded to the announcement by entering the service override code or indicating the desire to leave a voice message. According to one embodiment, the call may be ended if the caller does not respond to the announcement.

From block 70, the process may proceed to block 72, or to block 74. If the calling party has indicated a desire to leave a voice message, the process proceeds from block 70 to block 72, where the IP 20 may gather the information indicating a desire to leave a voice message, then connect the calling party to the customer's voice mailbox via the host SSP 12*b*. If the calling party has entered a service override code, the process proceeds from block 70 to block 74, where the IP 20 may capture the entered service override code and redirect the call to the SSP 12*a* via the host SSP 12*b*. From block 74, the process proceeds to block 76, where the termination attempt trigger 26 provisioned to the SSP 12*a* is activated in response to receipt of the call redirected from the IP 20 via the host SSP 12*b*. From block 76, the process proceeds to block 78, where the SSP 12*a* detects or recognizes the activated trigger. From block 78, the process proceeds to block 80, where the SSP 12*a* suspends normal call processing, and generates a query message for call-processing instructions. From block 80, the process proceeds to block 82, where the SSP 12*a* transmits the query message to the SCP 16 via the STP 14.

From block 82, the process proceeds to block 84, where the SCP 16 receives the query message transmitted from the SSP 12*a*. From block 84, the process proceeds to block 86, where the SCP 16 recognizes that the query was generated in response to a call redirected from the IP 20, and the SCP 16 determines whether the service override code entered by the calling party is a valid service override code. The SCP 16 may determine whether the service override code entered by the calling party is a valid service override code by comparing the service override code entered by the calling party to a list of valid service override codes populated in the database 18.

From block 86, the process may proceed to block 88, or to block 90. If the SCP 16 determines that the service override code entered by the calling party is a valid service override code, the process proceeds from block 86 to block 88, where the SCP 16 generates a response message instructing the SSP 12*a* to connect the call to the subscriber line connected to the customer's landline telephone 24, and transmits the response message to the SSP 12*a* via the STP 14. From block 88, the process proceeds to block 58, where the process proceeds as described hereinbefore.

If the SCP 16 determines that the service override code entered by the calling party is not a valid service override code, the process proceeds from block 86 to block 90, where the SCP 16 generates a response message instructing the SSP 12*a* to end the call, and transmits the response message to the SSP 12*a* via the STP 14. From block 90, the process proceeds to block 92, where response message is received by the SSP 12*a*, and the call is ended.

Figure 4A:
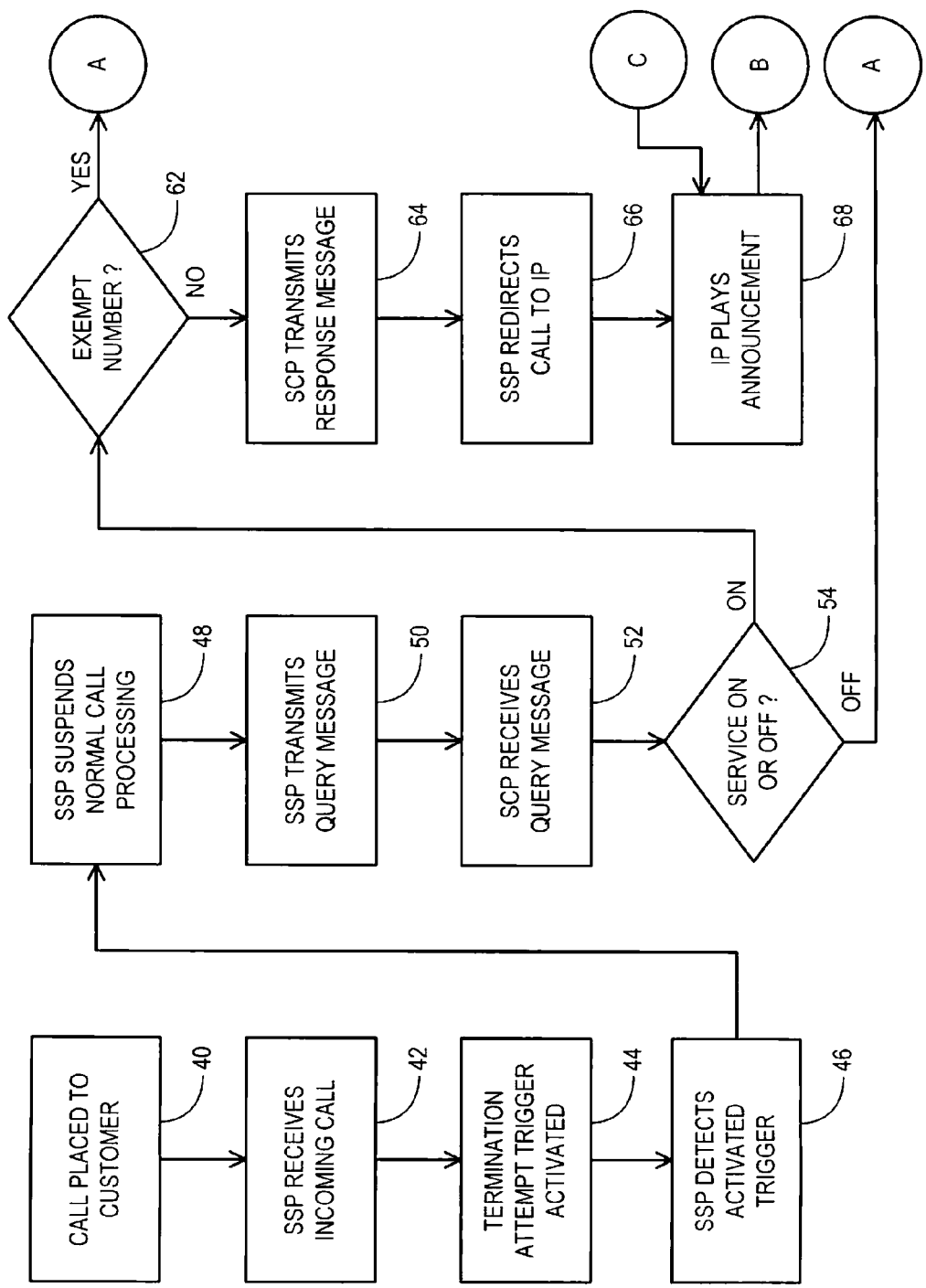
FIGS. 4A–4C illustrate one embodiment of a process flow of the call restriction system of FIG. 2.
Figure 4B:
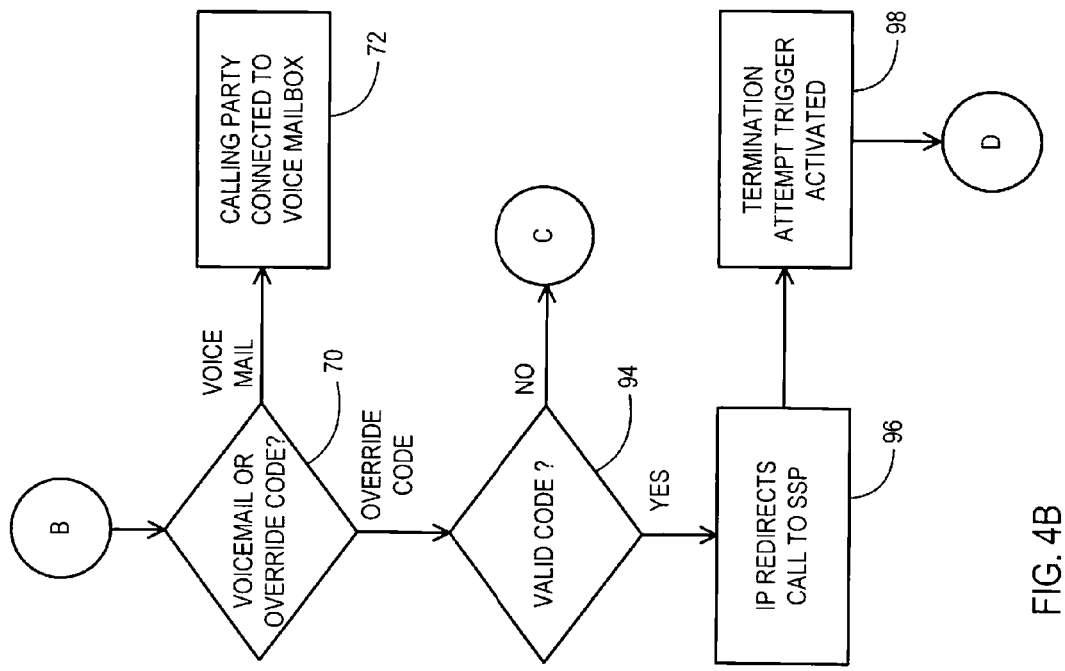
Figure 4B:
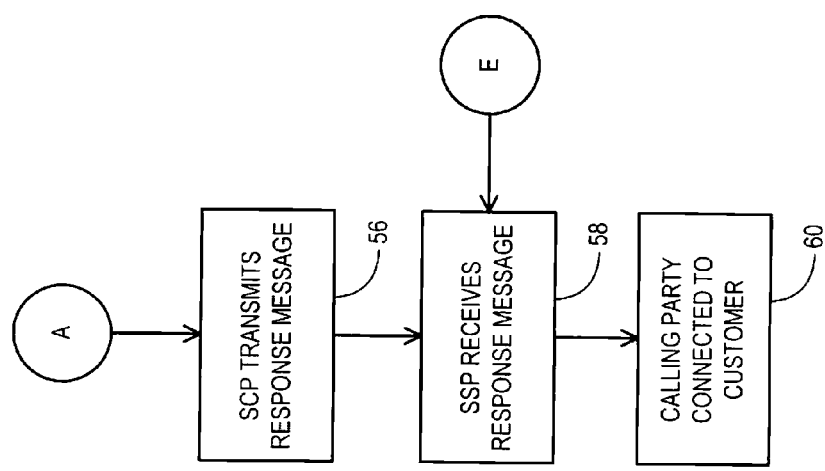
Figure 4C:
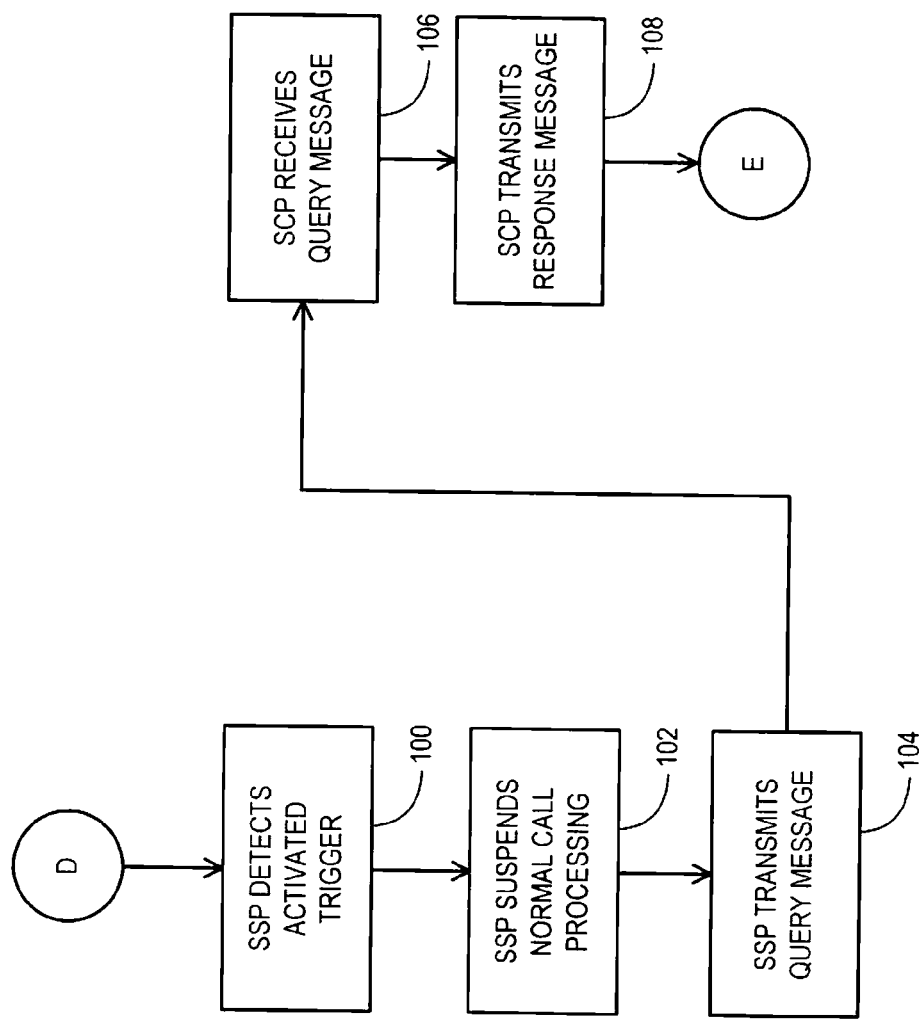

FIGS. 4A–4C illustrate a process flow of one embodiment of the call restriction system 10 of FIG. 2. The process flow is identical to the process flow described hereinabove with respect to FIGS. 3A–3C for blocks 40–70. Thus, this process flow will only be described from block 70 forward.

From block 70, the process may proceed to block 94, where the IP 20 determines whether the service override code entered by the calling party is a valid service override code. The IP 20 may determine whether the service override code entered by the calling party is a valid service override code by requesting the SCP 16 to compare the service override code entered by the calling party to a list of valid service override codes populated in the database 18. The IP 20 may send the request to the SCP 16 via the communication link 38, and the SCP 16 may inform the IP 20 of its determination via communication link 38. According to another embodiment, the IP 20 may determine whether the service override code input by the calling party is a valid service override code by comparing the service override code input by the calling party to a list of valid service override codes populated in a database associated with the IP 20.

From block 94, the process may proceed to block 96, or back to block 68. If the service override code input by the calling party is not a valid service override code, the process proceeds from block 94 back to block 68, where the process proceeds as described hereinabove. According to one embodiment, if a predetermined number of invalid service override codes have been input by the calling party, the call may be disconnected. If the service override code input by the calling party is a valid service override code, the process proceeds from block 94 to block 96, where the call is redirected from the IP 20 to the SSP 12a via the host SSP 12b. From block 96, the process proceeds to block 98, where the termination attempt trigger 26 provisioned to the SSP 12a is activated in response to receipt of the call redirected from the IP 20 via the host SSP 12b. From block 98, the process proceeds to block 100, where the SSP 12a detects or recognizes the activated trigger. From block 100, the process proceeds to block 102, where the SSP 12a suspends normal call processing. From block 102, the process proceeds to block 104, where the SSP 12a generates a query message for call-processing instructions, and transmits the query message to the SCP 16 via the STP 14.

From block 104, the process proceeds to block 106, where the SCP 16 receives the query message transmitted from the SSP 12a, and recognizes that the query was generated in response to a call redirected from the IP 20. From block 106, the process proceed to block 108, where the SCP 16 generates a response message instructing the SSP 12a to connect the call to the subscriber line connected to the customer's landline telephone 24, and transmits the response message to the SSP 12a via the STP 14. From block 108, the process proceedS to block 58, where the process proceeds as described herinbefore.

While several embodiments of the invention have been described, it should be apparent, however, that various modifications, alterations and adaptations to those embodiments may occur to persons skilled in the art with the attainment of some or all of the advantages of the present invention. For example, the systems and methods described hereinabove may also be adapted to restrict incoming calls to wireless telephones. It is therefore intended to cover all such modifications, alterations and adaptations without departing from the scope and spirit of the present invention as defined by the appended claims.

What is claimed is:

1. A method for restricting the completion of a call made to a subscriber, the method comprising:
    activating a termination attempt trigger;
    requesting from a switch a call-processing instruction in response to detection of the activated termination attempt trigger by sending a first query and requesting from the switch a call completion by sending a second query once the call is returned to the switch after the first query;
    determining at a controller receiving the requests a proper call-processing instruction by determining whether a call restriction is activated for the called number and determining whether the calling number is exempt and determining at the controller in response to the second query whether an override code is valid where the calling number is not exempt and override code is provided;
    receiving the call-processing instructions;
    in response to the calling number not being exempt, redirecting the call responsive to the call-processing instructions to an intelligent peripheral so that the redirected call may be queried for an override code and providing the call back to the switch upon receiving the valid override code;
    in response to the controller determining that a predefined number of attempts to provide the valid override code have been unsuccessful, canceling the call; and
    in response to the controller determining that the valid override code has been provided within the predetermined number of attempts, then completing the call.

2. The method of claim 1, wherein activating the termination attempt trigger includes receiving the call at a service switching point associated with the subscriber.

3. The method of claim 1, wherein activating the termination attempt trigger includes activating a termination attempt trigger provisioned to a local loop associated with the subscriber.

4. The method of claim 1, wherein requesting call-processing instructions includes:
    assembling an information-collected message; and
    transmitting a query message.

5. The method of claim 4, wherein transmitting the query message includes transmitting the information-collected message.

6. The method of claim 4, wherein transmitting the query message includes transmitting the query message to a service control point.

7. The method of claim 4, wherein transmitting the query message includes transmitting the query message to a service control point via out-of-band signaling.

8. The method of claim 7, wherein transmitting the query message to the service control point via out-of-band signaling includes transmitting the query message to the service control point using the signaling system seven (SS7) signaling protocol.

9. The method of claim 1, wherein receiving call-processing instructions includes:
    generating a response message; and
    receiving the response message.

10. The method of claim 9, wherein generating the response message includes generating an analyze-route message at a service control point.

11. The method of claim 9, wherein receiving the response message includes receiving the response message at a service switching point.

12. The method of claim 11, wherein receiving the response message at the service switching point includes receiving an analyze-route message transmitted from a service control point.

13. The method of claim 11, wherein receiving the response message at the service switching point includes receiving a call forward instruction transmitted from a service control point.

14. The method of claim 11, wherein receiving the response message at the service switching point includes receiving the response message from a service control point via out-of-band signaling.

15. The method of claim 1, wherein redirecting the call includes redirecting the call to an intelligent peripheral.

16. The method of claim 15, wherein redirecting the call to an intelligent peripheral includes redirecting the call to a compact service node.

17. The method of claim 1, further comprising:
establishing a connection between the intelligent peripheral and a calling party; and
playing an announcement.

18. The method of claim 17, further comprising:
receiving a response from the calling party;
determining whether the response indicates a request to be connected to a voice mailbox; and
redirecting the call to a voice mailbox.

19. The method of claim 17, further comprising:
receiving a response from the calling party;
determining whether the response represents a valid service override code; and
redirecting the call to the service switching point.

20. A system for restricting the completion of a call made to a subscriber, the system comprising:
means for detecting an activated termination attempt trigger;
means for requesting call-processing instructions in response to detection of the activated termination attempt trigger by sending a first query and for requesting call completion by sending a second query;
controller means for determining a proper call-processing instruction upon receiving the first query by determining whether that a call restriction is activated for the called number and determining whether the calling number is exempt,
for redirecting the call responsive to the call-processing instructions in response to the calling number not being exempt so that the redirected call may be queried for an override code, and for determining whether the override code is valid and for completing the call from the switch when the override code is upon receiving the second query;
intelligent peripheral means for prompting for entry of the override code, for returning the call to the means for requesting upon receiving the override code within a predefined number of attempts to provide a valid override code, and
for redirecting the call again to voicemail in response to the valid override code not being provided within the predetermined number of attempts.

21. A computer-readable medium having stored thereon instructions which, when executed by a processor, cause the processor to:
receive a first query;
in response to the first query, determine whether a call restriction service is enabled;
in response to determining that the call restriction service is enabled, determine whether a telephone number associated with a calling party is an exempt telephone number;
in response to determining that the telephone number is not exempt, generate call-processing instructions that include directing the call to an intelligent peripheral so that the calling party is queried for an override code in response to the calling party not being an exempt telephone number;
in response to an override code being provided to the intelligent peripheral and the intelligent peripheral transferring the override code, determining whether the transferred override code is valid within a predefined number of attempts to provide the valid override code;
in response to determining that the valid override code has been provided within the predetermined number of attempts to provide the valid override code, then completing the call; and
terminating the call in response to the valid override call not being provided within the predetermined number of attempts.

* * * * *